(12) United States Patent
Lee et al.

(10) Patent No.: US 11,434,315 B2
(45) Date of Patent: Sep. 6, 2022

(54) PROPYLENE POLYMERIZING SOLID CATALYST FOR REDUCING VOC AND METHOD OF PRODUCING POLYPROPYLENE USING SAME

(71) Applicant: HANWHA TOTAL PETROCHEMICAL CO., LTD., Seosan-si (KR)

(72) Inventors: Young Joo Lee, Suwon-si (KR); Su Min Ko, Gwacheon-si (KR); Joon Ryeo Park, Seoul (KR); Eun Il Kim, Seosan-si (KR)

(73) Assignee: HANWHA TOTAL PETROCHEMICAL CO., LTD., Seosan-Si (KR)

( * ) Notice: Subject to any disclaimer, the term of this patent is extended or adjusted under 35 U.S.C. 154(b) by 58 days.

(21) Appl. No.: 16/668,917

(22) Filed: Oct. 30, 2019

(65) Prior Publication Data

US 2020/0172641 A1 Jun. 4, 2020

(30) Foreign Application Priority Data

Nov. 13, 2018 (KR) .................. 10-2018-0139165

(51) Int. Cl.
*C08F 10/06* (2006.01)
(52) U.S. Cl.
CPC .................. *C08F 10/06* (2013.01)

(58) Field of Classification Search
CPC ..... C08F 10/06; C08F 4/6435; C08F 4/65916
See application file for complete search history.

(56) References Cited

U.S. PATENT DOCUMENTS

2008/0125555 A1\* 5/2008 Matsunaga ............. C08F 10/00
526/108

FOREIGN PATENT DOCUMENTS

JP 2014201602 A \* 10/2014

OTHER PUBLICATIONS

Machine translation of JP 2014-201602A. (Year: 2014).\*

\* cited by examiner

*Primary Examiner* — Catherine S Branch
(74) *Attorney, Agent, or Firm* — Harness, Dickey & Pierce, P.L.C.

(57) ABSTRACT

The present invention relates to a propylene polymerizing solid catalyst for reducing the volatile organic compound (VOC) and a method of producing polypropylene using the propylene polymerizing solid catalyst, the propylene polymerizing solid catalyst including an organic electron donor formed of a combination of a first internal electron donor of titanium, magnesium, halogen and cyclic diester and a second internal electron donor of diether, and has improved hydrogen reactivity of a catalyst compared to a conventional method and has an effect that is capable of producing an eco-friendly polypropylene which has greatly lowered a content of the VOC by using the catalyst.

5 Claims, No Drawings

PROPYLENE POLYMERIZING SOLID CATALYST FOR REDUCING VOC AND METHOD OF PRODUCING POLYPROPYLENE USING SAME

CROSS-REFERENCE TO RELATED APPLICATION

This application claims the benefit and priority of Korean Patent Application No. 10-2018-0139165 filed Nov. 13, 2018. The entire disclosure of the above application is incorporated herein by reference.

FIELD

The present disclosure relates to a propylene polymerizing solid catalyst for reducing a volatile organic compound (VOC) and a method of producing polypropylene using the same, and more specifically, to a solid catalyst including a carrier obtained by making dialkoxymagnesium react with a metal halide, and a titanium halide and an organic electron donor, and a method of producing polypropylene using the same.

BACKGROUND

This section provides background information related to the present disclosure which is not necessarily prior art.

Polypropylene, as an industrially or commercially very valuable material, has been diversely used particularly from household goods to vehicles, electronic goods, etc. When producing these products, a polypropylene polymer powder is melted and used, and particularly when producing large-sized products, high melt-flowability of polypropylene is needed. Such a melt-flowability is directly influenced by molecular weight of polypropylene. Although melt-flowability may be improved by increasing an injection amount of hydrogen during polymerization of propylene, thereby reducing molecular weight of propylene, high activity of a propylene polymerizing catalyst is essential since there is a limitation in the injection amount of hydrogen.

In this regard, although a method of producing polypropylene by making a catalyst including a diether internal electron donor react with a silane-based compound has been introduced in Korean Patent No. 10-1540513, there is a need for improving activity and stereoregularity, a method of increasing activity of a propylene polymerizing solid catalyst using a bicycloalkenedicarboxylate-based internal electron donor has been introduced as disclosed in Korean Patent No. 10-1207628, or a method of improving activity, apparent density and stereoregularity with a catalyst including an internal electron donor selecting any one selected from the group consisting of a phthalate-based compound, a carboxylic acid ester compound, and a diether compound has been introduced in Korean Patent No. 10-1126946.

Although a volatile organic compound (VOC), as a low molecular weight oligomer component which is produced during polypropylene polymerization and remained in a polypropylene resin, is used as vehicle interior material, a fogging phenomenon and a problem of causing harmfulness to the human body occur when the VOC is exposed to a high temperature environment. Accordingly, a demand for an eco-friendly polypropylene with a lowered VOC content is being increased as accidents or damages are generated.

Therefore, the present invention relates to a solid catalyst including an organic electron donor as a combination of two types of internal electron donors including a first internal electron donor having a titanium halide and a compound of a cyclic diester structure and a second internal electron donor including a compound of a diether structure included in a carrier produced by making dialkoxymagnesium react with a metal halide, and the present invention provides a propylene polymerizing solid catalyst capable of producing an eco-friendly polypropylene which improves hydrogen reactivity of a catalyst and lowers the content of a total volatile organic compound (T-VOC) using the catalyst, and a method of producing polypropylene using the propylene polymerizing solid catalyst.

Therefore, the present invention has been devised to solve problems of the prior art, and the purpose of the present invention is to provide a catalyst having high hydrogen reactivity and enabling adjustment of molecular weight distribution through a solid catalyst including an organic electron donor as a combination of internal electron donors including a first internal electron donor of a cyclic diester structure and a second internal electron donor of a diether structure, a propylene polymerizing solid catalyst having a VOC reduction effect using the catalyst, and a method of producing polypropylene using the propylene polymerizing solid catalyst.

SUMMARY

This section provides a general summary of the disclosure, and is not a comprehensive disclosure of its full scope or all of its features.

In order to achieve the purpose, the present invention provides a propylene polymerizing solid catalyst including a carrier produced by making dialkoxymagnesium react with a metal halide, a titanium halide, and an organic electron donor formed of a combination of a first internal electron donor including a cyclic diester compound and a second internal electron donor including a diether compound.

A method of preparing a propylene polymerizing solid catalyst includes the following steps:

(1) making diethoxymagnesium react with a metal halide compound at a relatively low reaction temperature in the presence of an organic solvent;

(2) reacting two types of internal electron donors while increasing temperature after reacting diethoxymagnesium;

(3) performing a reaction process at high temperatures for a predetermined time; and (4) secondly reacting a resulting material with a metal halide compound at high temperatures to obtain a product and washing the product.

In the above-specified solid catalyst preparation process, diethoxymagnesium used in the step (1) is spherical particles, which have an average particle diameter of 10 to 200 µm and of which surfaces are smooth, obtained by making metal magnesium react with anhydrous alcohol in the presence of magnesium chloride, and it is preferable to maintain the spherical particles as they are even during polymerization of propylene. The average particle diameter is not preferable since fine particles of a prepared catalyst are increased when the average particle diameter is less than 10 µm, and the average particle diameter is not preferable since apparent density of the particles is decreased, and it is difficult for the particles to have a uniform particle shape during preparation of the catalyst when the average particle diameter is more than 200 µm.

Types of the organic solvent used in the step (1) are not particularly limited, examples of the organic solvent may include aliphatic and aromatic hydrocarbons, halogenated hydrocarbons, and the like having 6 to 12 carbon atoms, more preferably saturated aliphatic or aromatic hydrocarbons and halogenated hydrocarbons having 7 to 10 carbon atoms, and specific examples of the organic solvent may include a mixture of one or more selected from the group consisting of heptane, octane, nonane, decane, toluene, xylene, chlorohexane, chloroheptane, etc.

A use ratio of the organic solvent to diethoxymagnesium is 1:5 to 1:50 as a ratio of a diethoxymagnesium weight to an organic solvent volume, more preferably 1:7 to 1:20. It is difficult to uniformly stir the slurry since viscosity of a slurry is rapidly increased when the use ratio is less than 1:5, while the use ratio is not desirable since there is a problem that apparent density of a carrier produced is rapidly decreased, or particles of the carrier have rough surfaces when the use ratio is more than 1:50.

A titanium halide used in the solid catalyst preparation process may be represented by the following chemical formula (i):

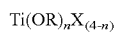  (i)

wherein, R is an alkyl group having 1 to 10 carbon atoms, X indicates a halogen element, and n, which is for adjusting valence of chemical formula (i), is an integer of 0 to 3. Specific examples of the titanium halide may include $TiCl_4$, $Ti(OCH_3)Cl_3$, $Ti(OC_2H_5)Cl_3$, $Ti(OC_3H_7)Cl_3$, $Ti(O(n-C_4H_9))Cl_3$, $Ti(OCH_3)_2Cl_2$, $Ti(OC_2H_5)_2Cl_2$, $Ti(OC_3H_7)_2Cl_2$, $Ti(O(n-C_4H_9))_2Cl_2$, $Ti(OCH_3)_3Cl$, $Ti(OC_2H_5)_3Cl$, $Ti(OC_3H_7)_3Cl$, $Ti(O(n-C_4H_9))_3Cl$, etc. $TiCl_4$ among them is preferably used as the titanium halide. Further, the specific examples of the titanium halide may include one of these tetravalent titanium halide compounds or a combination of two or more thereof. The reaction temperature of the step (1) is −10 to 60° C.

The first internal electron donor out of two types of internal electron donors shown in the step (2) includes a cyclic diester-based compound that is one of compounds represented by the following structural formulas (I) to (VIII).

In the following structural formulas (I) to (VIII), R1 and R2, which are the same as or different from each other, are a linear, branched or cyclic alkyl group, alkenyl group, aryl group, arylalkyl group or alkylaryl group having 1 to 20 carbon atoms; and R3 to R12, which are the same as or different from one another, are hydrogen or a linear, branched or cyclic alkyl group, alkenyl group, aryl group, arylalkyl group or alkylaryl group having 1 to 20 carbon atoms.

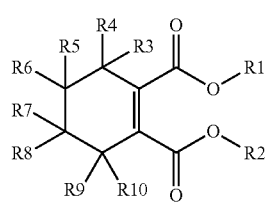  (I)

Specific examples of a compound of the structural formula (I) may include dimethyl cyclohex-1-ene-1,2-dicarboxylate, diethyl cyclohex-1-ene-1,2-dicarboxylate, 1-ethyl 2-methylcyclohex-1-ene-1,2-dicarboxylate, 1-ethyl 2-propylcyclohex-1-ene-1,2-dicarboxylate, dipropylcyclohex-1-ene-1,2-dicarboxylate, diisopropyl cyclohex-1-ene-1,2-dicarboxylate, diethyl 3-methylcyclohex-1-ene-1,2-dicarboxylate, diethyl 3,3-dimethylcyclohex-1-ene-1,2-dicarboxylate, diethyl 3,3,4,4-tetramethylcyclohex-1-ene-1,2-dicarboxylate, diethyl 3,3,4,4,6-pentamethylcyclohex-1-ene-1,2-dicarboxylate, dibutyl 4,5-dimethylcyclohex-1-ene-1,2-dicarboxylate, 2-ethyl 1-propyl 5-ethyl-3,3,4-trimethylcyclohex-1-ene-1,2-dicarboxylate, etc.

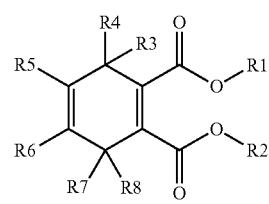  (II)

Specific examples of a compound of the structural formula (II) may include dimethylcyclohexa-1,4-diene-1,2-dicarboxylate, diethylcyclohexa-1,4-diene-1,2-dicarboxylate, dipropylcyclohexa-1,4-diene-1,2-dicarboxylate, diisopropylcyclohexa-1,4-diene-1,2-dicarboxylate, diethyl 3-methylcyclohexa-1,4-diene-1,2-dicarboxylate, diethyl 3,3-dimethylcyclohexa-1,4-diene-1,2-dicarboxylate, diethyl 3,3,6-trimethylcyclohexa-1,4-diene-1,2-dicarboxylate, diethyl 3,3,6,6-tetramethylcyclohexa-1,4-diene-1,2-dicarboxylate, diethyl 3,3,4,5,6,6-hexamethylcyclohexa-1,4-diene-1,2-dicarboxylate, 1-ethyl 2-propyl 4-ethyl-3,5,6-trimethylcyclohexa-1,4-diene-1,2-dicarboxylate, 2-ethyl 1-propyl 5-ethyl-3,3,4,6-tetramethylcyclohexa-1,4-diene-1,2-dicarboxylate, etc.

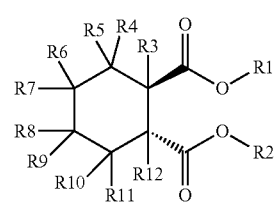  (III)

Specific examples of a compound of the structural formula (III) may include trans-dimethyl-cyclohexane-1,2-dicarboxylate, trans-1-ethyl 2-methyl cyclohexane-1,2-dicarboxylate, trans-diethyl cyclohexane-1,2-dicarboxylate, trans-1-ethyl 2-propylcyclohexane-1,2-dicarboxylate, trans-2-ethyl 1-propyl 1-methylcyclohexane-1,2-dicarboxylate, trans-1-ethyl 2-propyl 1,2-dimethylcyclohexane-1,2-dicarboxylate, trans-1-ethyl 2-propyl 1,2,4,4-tetramethylcyclohexane-1,2-dicarboxylate, trans-1-ethyl 2-propyl-1,2,4,4,5,5-hexamethylcyclohexane-1,2-dicarboxylate, trans-1-butyl 2-ethyl-1,4,5,5-tetramethylcyclohexane-1,2-dicarboxylate, etc.

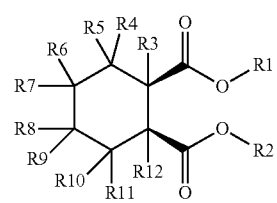  (IV)

Specific examples of a compound of the structural formula (IV) may include cis-dimethyl-cyclohexane-1,2-dicarboxylate, cis-1-ethyl 2-methylcyclohexane-1,2-dicarboxylate, cis-diethylcyclohexane-1,2-dicarboxylate, cis-1-ethyl 2-propylcyclohexane-1,2-dicarboxylate, cis-2-ethyl 1-propyl 1-methylcyclohexane-1,2-dicarboxylate, cis-1-ethyl 2-propyl 1,2-dimethylcyclohexane-1,2-dicarboxylate, cis-1-ethyl 2-propyl-1,2,4,4-tetramethylcyclohexane-1,2-dicarboxylate, cis-1-ethyl 2-propyl-1,2,4,4,5,5-hexamethylcyclohexane-1,2-dicarboxylate, cis-1-butyl 2-ethyl-1,4,5,5-tetramethylcyclohexane-1,2-dicarboxylate, etc.

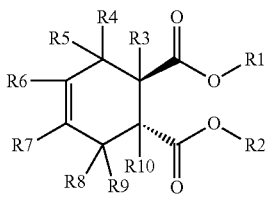

(V)

Specific examples of a compound of the structural formula (V) may include trans-dimethylcyclohex-4-ene-1,2-dicarboxylate, trans-diethylcyclohex-4-ene-1,2-dicarboxylate, trans-dipropylcyclohex-4-ene-1,2-dicarboxylate, trans-diisopropylcyclohex-4-ene-1,2-dicarboxylate, trans-dibutylcyclohex-4-ene-1,2-dicarboxylate, trans-1-ethyl-2-methylcyclohex-4-ene-1,2-dicarboxylate, trans-1-ethyl-2-propylcyclohex-4-ene-1,2-dicarboxylate, trans-1-ethyl-2-propyl 3-methylcyclohex-4-ene-1,2-dicarboxylate, trans-1-ethyl-2-propyl 3,6-dimethylcyclohex-4-ene-1,2-dicarboxylate, trans-2-ethyl-1-propyl 3,4,6-trimethylcyclohex-4-ene-1,2-dicarboxylate, trans-2-ethyl-1-propyl 4-ethyl 3,6-dimethylcyclohex-4-ene-1,2-dicarboxylate, etc.

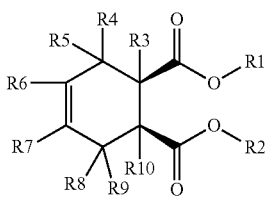

(VI)

Specific examples of a compound of the structural formula (VI) may include cis-dimethylcyclohex-4-ene-1,2-dicarboxylate, cis-diethylcyclohex-4-ene-1,2-dicarboxylate, cis-dipropylcyclohex-4-ene-1,2-dicarboxylate, cis-diisopropylcyclohex-4-ene-1,2-dicarboxylate, cis-dibutylcyclohex-4-ene-1,2-dicarboxylate, cis-1-ethyl-2-methylcyclohex-4-ene-1,2-dicarboxylate, cis-1-ethyl-2-propylcyclohex-4-ene-1,2-dicarboxylate, cis-1-ethyl-2-propyl 3-methylcyclohex-4-ene-1,2-dicarboxylate, cis-1-ethyl-2-propyl 3,6-dimethylcyclohex-4-ene-1,2-dicarboxylate, cis-2-ethyl-1-propyl 3,4,6-trimethylcyclohex-4-ene-1,2-dicarboxylate, cis-2-ethyl-1-propyl 4-ethyl 3,6-dimethylcyclohex-4-ene-1,2-dicarboxylate, etc.

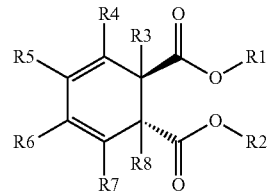

(VII)

Specific examples of a compound of the structural formula (VII) may include trans-dimethylcyclohexa-3,5-diene-1,2-dicarboxylate, trans-diethylcyclohexa-3,5-diene-1,2-dicarboxylate, trans-dipropylcyclohexa-3,5-diene-1,2-dicarboxylate, trans-dibutylcyclohexa-3,5-diene-1,2-dicarboxylate, trans-dimethyl 1-methylcyclohexa-3,5-diene-1,2-dicarboxylate, trans-dimethyl 1,2-dimethylcyclohexa-3,5-diene-1,2-dicarboxylate, trans-1-ethyl 2-propyl 1,2-dimethylcyclohexa-3,5-diene-1,2-dicarboxylate, trans-diethyl 4-methylcyclohexa-3,5-diene-1,2-dicarboxylate, trans-diethyl 4,5-dimethylcyclohexa-3,5-diene-1,2-dicarboxylate, trans-diethyl 4-ethyl-3,5,6-trimethylcyclohexa-3,5-diene-1,2-dicarboxylate, etc.

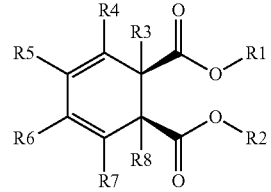

(VIII)

Specific examples of a compound of the structural formula (VIII) may include cis-dimethylcyclohexa-3,5-diene-1,2-dicarboxylate, cis-diethylcyclohexa-3,5-diene-1,2-dicarboxylate, cis-dipropylcyclohexa-3,5-diene-1,2-dicarboxylate, cis-dibutylcyclohexa-3,5-diene-1,2-dicarboxylate, cis-dimethyl 1-methylcyclohexa-3,5-diene-1,2-dicarboxylate, cis-dimethyl 1,2-dimethylcyclohexa-3,5-diene-1,2-dicarboxylate, cis-1-ethyl 2-propyl 1,2-dimethylcyclohexa-3,5-diene-1,2-dicarboxylate, cis-diethyl 4-methylcyclohexa-3,5-diene-1,2-dicarboxylate, cis-diethyl 4,5-dimethylcyclohexa-3,5-diene-1,2-dicarboxylate, cis-diethyl 4-ethyl-3,5,6-trimethylcyclohexa-3,5-diene-1,2-dicarboxylate, etc.

A compound with a diether structure represented by the following chemical formula (ii) may be used as the above-mentioned second internal electron donor:

$$R13R14C(CH_2OR15)(CH_2OR16) \qquad (ii)$$

wherein, the compound is a 1,3-diether compound in which: R13 and R14, which are the same as or different from each other, are an alkyl radical having 1 to 18 carbon atoms, a cycloalkyl radical having 3 to 18 carbon atoms, or an aryl radical having 7 to 18 carbon atoms; R15 and R16, which are the same as or different from each other, are an alkyl radical having 1 to 4 carbon atoms; and a carbon atom at the second position belongs to a cyclic containing 2 or 3 unsaturated hydrocarbons and consisting of 5, 6 or 7 carbon atoms.

Specific examples of a 1,3-diether based compound that is the second internal electron donor may include 2-(2-ethylhexyl)-1,3-dimethoxypropane, 2-isopropyl-1,3-dimethoxypropane, 2-butyl-1,3-dimethoxypropane, 2-sec-butyl-1,3-dimethoxypropane, 2-cyclohexyl-1,3-dimethoxypropane, 2-phenyl-1,3-dimethoxypropane, 2-t-butyl-1,3-dimethoxypropane, 2-cumyl-1,3-dimethoxypropane, 2-(2-phenylethyl)-1,3-dimethoxypropane, 2-(2-cyclohexylethyl)-1,3-dimethoxypropane, 2-(p-chlorophenyl)-1,3-dimethoxypropane, 2-(diphenylmethyl)-1,3-dimethoxypropane, 2(1-naphthyl)-1,3-dimethoxypropane, 2(p-fluorophenyl)-1,3-dimethoxypropane, 2(1-decahydronaphthyl)-1,3-dimethoxypropane, 2(pt-butylphenyl)-1,3-dimethoxypropane, 2,2-dicyclohexyl-1,3-dimethoxypropane, 2,2-diethyl-1,3-dimethoxypropane, 2,2-dipropyl-1,3-dimethoxypropane, 2,2-dibutyl-1,3-dimethoxypropane, 2,2-diethyl-1,3-diethoxypropane, 2,2-dicyclopentyl-1,3-dimethoxypropane, 2,2-dipropyl-1,3-diethoxypropane, 2,2-dibutyl-1,3-diethoxypropane, 2-methyl-2-ethyl-1,3-dimethoxypropane, 2-methyl-2-propyl-1,3-dimethoxypropane, 2-methyl-2-benzyl-1,3-dimethoxypropane, 2-methyl-2-phenyl-1,3-dimethoxypropane, 2-methyl-2-cyclohexyl-1,3-dimethoxypropane, 2-methyl-2-methylcyclohexyl-1,3-dimethoxypropane, 2,2-bis(p-chlorophenyl)-1,3-dimethoxypropane, 2,2-bis(2-phenylethyl)-1,3-dimethoxypropane, 2,2-bis(2-cyclohexylethyl)-1,3-dimethoxypropane, 2-methyl-2-isobutyl-1,3-dimethoxypropane, 2-methyl-2-(2-ethylhexyl)-1,3-dimethoxypropane, 2,2-bis(2-ethylhexyl)-1,3-dimethoxypropane, 2,2-bis(p-methylphenyl)-1,3-dimethoxypropane, 2-methyl-2-isopropyl-1,3-dimethoxypropane, 2,2-diisobutyl-1,3-dimethoxypropane, 2,2-diphenyl-1,3-dimethoxypropane, 2,2-dibenzyl-1,3-dimethoxypropane, 2-isopropyl-2-cyclopentyl-1,3-dimethoxypropane, 2,2-bis(cyclohexylmethyl)-1,3-dimethoxypropyl, 2,2-diisobutyl-1,3-diethoxypropane, 2,2-diisobutyl-1,3-dibutoxypropane, 2-isobutyl-2-isopropyl-1,3-dimethoxypropane, 2,2-di-sec-butyl-1,3-dimethoxypropane, 2,2-di-t-butyl-1,3-dimethoxypropane, 2,2-dineopentyl-1,3-dimethoxypropane, 2-isopropyl-2-isopentyl-1,3-dimethoxypropane, 2-phenyl-2-benzyl-1,3-dimethoxypropane, 2-cyclohexyl-2-cyclohexylmethyl-1,3-dimethoxypropane, 9,9-bis(methoxymethyl)fluorene, 9,9-bis(methoxymethyl)-2,3,6,7-tetramethylfluorene, 9,9-bis(methoxymethyl)-2,3,4,5,6,7-hexafluorofluorene, 9,9-bis(methoxymethyl)-2,3-benzofluorene, 9,9-bis(methoxymethyl)-2,3,6,7-dibenzofluorene, 9,9-bis(methoxymethyl)-2,7-diisopropylfluorene, 9,9-bis(methoxymethyl)-1,8-dichlorofluorene, 9,9-bis(methoxymethyl)-2,7-dicyclopentylfluorene, 9,9-bis(methoxymethyl)-1,8-difluorofluorene, 9,9-bis(methoxymethyl)-1,2,3,4-tetrahydrofluorene, 9,9-bis(methoxymethyl)-1,2,3,4,5,6,7,8-octahydrofluorene, 9,9-bis(methoxymethyl)-4-t-butylfluorene, etc.

It is desirable to perform the step (2) by injecting an internal electron donor during a heating process while slowly heating a resulting material of the step (1) to a temperature of 60 to 150° C., preferably 80 to 130° C., thereby making the resulting material of the step (1) react with the internal electron donor for a reaction time of 1 to 3 hours. It is difficult to complete the reaction process when the temperature is less than 60° C., or the reaction time is less than 1 hour, while polymerization activity of a catalyst that is a resulting material or stereoregularity of a polymer may be lowered by a side reaction when the temperature is more than 150° C., or the reaction time is more than 3 hours.

As long as the first and second internal electron donors are injected during the heating process, injection temperatures and injection numbers of the first and second internal electron donors are not greatly limited, and the two internal electron donors may be simultaneously injected or may be injected at different temperatures. Although the total use amount of the two internal electron donors is not limited, it is preferable that the first internal electron donor is used in an amount range of 0.001 to 2.0 mol, and the second internal electron donor is used in the amount range of 0.001 to 2.0 mol as the total mol number of the two internal electron donors with respect to 1 mole of dialkoxymagnesium used. The total mol number of the two internal electron donors is not desirable since polymerization activity of the catalyst that is the resulting material or stereoregularity of the polymer may be lowered if use amounts of the two internal electron donors are deviated from the ranges.

The step (3) in a preparation process of the solid catalyst is a process of making a resulting material of the step (2) react with a titanium halide two or more times at a temperature of 60 to 150° C., more preferably 80 to 130° C. At this time, an example of the titanium halide used may include a titanium halide of chemical formula (i).

It is desirable in the preparation method of the solid catalyst that a reaction process in each of the steps is performed within a reactor having a stirrer mounted thereon in a nitrogen gas atmosphere after sufficiently removing moisture or the like from the stirrer.

The solid catalyst of the present invention prepared by the method includes magnesium, titanium, halogen, a silane-based compound, and an internal electron donor. When considering the aspect of catalytic activity, it is very desirable in a composition for lowering a VOC content that the solid catalyst is formed by including 5 to 40 wt % of magnesium, 0.5 to 10 wt % of titanium, 50 to 85 wt % of the halogen, 0.1 to 20 wt % of a first internal electron donor, and 0.1 to 20 wt % of a second internal electron donor.

A solid catalyst prepared by a method of preparing a catalyst of the present invention may be suitably used in a method of polymerizing propylene, and a method of polymerizing propylene using a solid catalyst for reduction of VOC prepared by the present invention includes polymerizing propylene in the presence of the solid catalyst, a cocatalyst, and an external electron donor.

In the method of polymerizing or copolymerizing propylene, examples of a cocatalyst component may include organometallic compounds of Group II or Group III in the periodic table. For example, alkylaluminum compounds may be preferably used as the cocatalyst component. The alkylaluminum compounds are represented by the following chemical formula (iii):

$$AlR_3 \hspace{2cm} (iii)$$

in which, R is an alkyl group having 1 to 6 carbon atoms.

Specific examples of the alkylaluminum compounds may include trimethylaluminum, triethylaluminum, tripropylaluminum, tributylaluminum, triisobutylaluminum, trioctylaluminum, etc.

Although there are some differences in ratios of the cocatalyst component to the solid catalyst component according to polymerization methods, a molar ratio of a metal atom in the cocatalyst component to titanium atom in the solid catalyst component is preferably in a range of 1 to 1,000, more preferably 10 to 300. If a molar ratio of the metal atom, e.g., aluminum atom in the cocatalyst component to titanium atom in the solid catalyst component is deviated from the range of 1 to 1,000, there is a problem that polymerization activity is greatly lowered.

In the method of polymerizing or copolymerizing propylene, examples of the external electron donor may include one or more of alkoxysilane compounds represented by the following chemical formula (iv):

$$R^1{}_m R^2{}_n Si(Or^3)_{(4-m-n)} \quad (iv)$$

in which, $R^1$ and $R^2$, which may be the same as or different from each other, are a linear, branched or cyclic alkyl group or aryl group having 1 to 12 carbon atoms, $R^3$ is a linear or branched alkyl group having 1 to 6 carbon atoms, m and n are each 0 or 1, and m+n is 1 or 2.

Specific examples of the external electron donor may include n-propyltrimethoxysilane, di-n-propyldimethoxysilane, isopropyltrimethoxysilane, diisopropyldimethoxysilane, n-butyltrimethoxysilane, di-n-butyldimethoxysilane, isobutyltrimethoxysilane, diisobutyldimethoxysilane, t-butyltrimethoxysilane, di-t-butyldimethoxy silane, n-pentyltrimethoxysilane, di-n-pentyldimethoxy silane, cyclopentyltrimethoxysilane, dicyclopentyldimethoxysilane, cyclopentylmethyldimethoxysilane, cyclopentylethyldimethoxysilane, cyclopentylpropyldimethoxysilane, cyclohexyltrimethoxysilane, dicyclohexyldimethoxysilane, cyclohexylmethyldimethoxysilane, cyclohexylethyldimethoxysilane, cyclohexylpropyldimethoxysilane, cycloheptyltrimethoxysilane, dicycloheptyldimethoxysilane, cycloheptylmethyldimethoxysilane, cycloheptylethyldimethoxysilane, cycloheptylpropyldimethoxysilane, phenyltrimethoxysilane, diphenyldimethoxysilane, phenylmethyldimethoxysilane, phenylethyldimethoxysilane, phenylpropyldimethoxysilane, n-propyltriethoxysilane, di-n-propyldiethoxysilane, isopropyltriethoxysilane, diisopropyldiethoxysilane, n-butyltriethoxysilane, di-n-butyldiethoxysilane, isobutyltriethoxysilane, diisobutyldiethoxysilane, t-butyltriethoxysilane, di-t-butyldiethoxysilane, n-pentyltriethoxysilane, di-n-pentyldiethoxysilane, cyclopentyltriethoxysilane, dicyclopentyldiethoxysilane, cyclopentylmethyldiethoxysilane, cyclopentylethyldiethoxysilane, cyclopentylpropyldiethoxysilane, cyclohexyltriethoxysilane, dicyclohexyldiethoxysilane, cyclohexylmethyldiethoxysilane, cyclohexylethyldiethoxysilane, cyclohexylpropyldiethoxysilane, cycloheptyltriethoxysilane, dicycloheptyldiethoxysilane, cycloheptylmethyldiethoxysilane, cycloheptylethyldiethoxysilane, cycloheptylpropyldiethoxysilane, phenyltriethoxysilane, diphenyldiethoxysilane, phenylmethyldiethoxysilane, phenylethyldiethoxysilane, phenylpropyldiethoxysilane, etc. The specific examples of the external electron donor may be used in a single or in a combination of two or more thereof.

Although there are some differences in use amounts of the external electron donor to the solid catalyst according to polymerization methods, a molar ratio of silicon atom in the external electron donor to titanium atom in the catalyst component is preferably in a range of 0.1 to 500, more preferably 1 to 100. The molar ratio is not desirable since stereoregularity of a propylene polymer produced is substantially low when a molar ratio of silicon atom in the external electron donor to titanium atom in the solid catalyst component is less than 0.1, while there is a problem that polymerization activity of the catalyst is remarkably lowered when the molar ratio is more than 500.

A polymerization reaction temperature in the propylene polymerizing or copolymerizing method is desirably 20 to 120° C. The polymerization reaction temperature is not desirable since a reaction process is not sufficiently progressed when the polymerization reaction temperature is less than 20° C., while the polymerization reaction temperature is not desirable since the polymerization reaction temperature not only deteriorates polymerization activity severely, but also adversely affects physical properties of a polymer when the polymerization reaction temperature is more than 120° C.

The present invention has improved catalytic activities and can adjust molecular weight distribution by using an organic electron donor as a combination of a first internal electron donor of a cyclic diester structure having a wide molecular weight distribution and a second internal electron donor of a diether structure having excellent hydrogen reactivity, thereby improving hydrogen reactivity of a catalyst, and can produce eco-friendly polypropylene with a greatly reduced volatile organic compound (VOC) content and can greatly improve melt-flowability by using the catalyst.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DETAILED DESCRIPTION

Hereinafter, preferred embodiments of the present invention will be described. However, the scope of the present invention is not limited to the following embodiments.

According to the present invention, a propylene polymerizing solid catalyst is provided, and polypropylene is produced using the propylene polymerizing solid catalyst, in which the propylene polymerizing solid catalyst includes a carrier produced by making dialkoxymagnesium react with a metal halide, a titanium halide, and an organic electron donor formed of a combination of a first internal electron donor including a compound of a cyclic diester structure and a second internal electron donor including a compound of a diether structure.

Example 1

Preparation of Solid Catalyst

After injecting 112 ml of toluene and 15 g of diethoxymagnesium having an average particle diameter of 20 μm, a spherical shape, a particle size distribution index of 0.86 and an apparent density of 0.35 g/cc into a glass reactor which was sufficiently filled with nitrogen gas and in which an one liter-sized stirrer was installed, maintaining a mixture of toluene and diethoxymagnesium at 10° C., and injecting a diluted solution obtained by diluting 20 ml of titanium tetrachloride into 30 ml of toluene into the mixture of toluene and diethoxymagnesium over 1 hour to obtain a mixture, 6.90 g of trans-dibutylcyclohexanedicarboxylate was injected into the mixture while heating the reactor to a temperature of 100° C., thereby obtaining a resulting material.

After maintaining the reactor at 100° C. for 2 hours, and lowering temperature of the reactor to 90° C., thereby stopping a stirring process to obtain a reaction product, a supernatant of the reaction product was removed, and the supernatant-removed product was washed one time by additionally using 200 ml of toluene.

120 ml of toluene and 20 ml of titanium tetrachloride were injected into the product, the reactor was heated to a temperature of 100° C., and the temperature of the reactor was maintained for 2 hours. A slurry mixture was obtained by repeatedly performing this process two times, thereby aging a resulting material.

A light yellowish solid catalyst was prepared by washing the slurry mixture passing through the aging process two times using 200 ml of toluene per one time, and washing the slurry mixture five times at 40° C. using 200 ml of n-hexane per one time.

3.6 wt % of titanium was included in a solid catalyst obtained by drying the solid catalyst in flowing nitrogen for 18 hours.

Propylene Polymerization 10 mg of the solid catalyst, 10 mmol of triethyl aluminum and 1 mmol of dicyclopentylmethyldimethoxysilane were injected into a 4 liter-sized stainless steel reactor for high pressure to prepare a mixture.

Subsequently, a polymerization process was performed by increasing temperature of the reactor to 70° C. after sequentially injecting 1,000 ml of hydrogen and 2.4 L of propylene of a liquid state into the mixture. Propylene within the reactor was completely deaerated to obtain a polymer by opening a valve while lowering the temperature of the reactor to room temperature when 2 hours had elapsed after initiating the polymerization process.

Analysis results of the polymer are represented in Table 1.

Example 2

When preparing the solid catalyst of Example 1, a solid catalyst was prepared by injecting a mixture of 5.24 g of cis-dibutylcyclohexane dicarboxylate and 1.61 g of isopentylisopropyldimethoxypropane instead of trans-dibutylcyclohexanedicarboxylate.

3.6 wt % of titanium was included in the prepared solid catalyst.

Next, a polypropylene polymerization process was performed in the same manner as in Example 1 to prepare polypropylene, and analysis results of polypropylene are represented in Table 1.

Example 3

When preparing the solid catalyst of Example 1, a solid catalyst was prepared by using a mixture of 4.18 g of cis-dibutylcyclohexane dicarboxylate and 3.42 g of isopentylisopropyldimethoxypropane instead of trans-dibutylcyclohexanedicarboxylate.

3.6 wt % of titanium was included in the prepared solid catalyst.

Next, a polypropylene polymerization process was performed in the same manner as in Example 1 to prepare polypropylene, and analysis results of polypropylene are represented in Table 1.

Comparative Example 1

When preparing the solid catalyst of Example 1, a solid catalyst was prepared by injecting 7.41 g of diisobutylphthalate instead of trans-dibutylcyclohexanedicarboxylate.

3.1 wt % of titanium was included in the prepared solid catalyst.

Next, a polypropylene polymerization process was performed in the same manner as in Example 1 to prepare polypropylene, and analysis results of polypropylene are represented in Table 1.

TABLE 1

| Catalyst | Activity (Kg-PP/g-cat 2 h) | MI (g/10 min) | X.S (wt %) | Tm (° C.) | PI |
|---|---|---|---|---|---|
| Example 1 | 55 | 2.7 | 2.0 | 162.3 | 6.8 |
| Example 2 | 63 | 5.0 | 1.05 | 161.4 | 4.3 |
| Example 3 | 72 | 6.2 | 1.5 | 161.4 | 4 |
| Comparative Example 1 | 78 | 78 | 1.6 | 163.1 | 4.2 |

① Catalytic activity (kg-PP/g-cat) = a production amount of polymer (kg) ÷ amount of catalyst (g)
② Melt-flowability (g/10 minute): a value measured at a temperature of 230° C. and a load of 2.16 kg in accordance with ASTM1238
③ Stereoregularity (X.S, wt %): wt % of a component melted after being crystallized and precipitated in a mixed xylene
④ Polydispersity index (PI): defined as PI = 106/Gc in case of unit of dyne/cm$^2$ when defining an elastic modulus value when G' and G" intersect as Gc Example 4

When performing a polypropylene polymerization process on the solid catalyst of Example 1 to produce a polymerized polymer, 15,000 ml of hydrogen instead of 1,000 ml of hydrogen was injected, and the other conditions were the same as in Example 1.

Analysis and VOC content results of the polymerized polymer are represented in Table 2.

Example 5

When performing a polypropylene polymerization process on the solid catalyst of Example 2 to produce a polymerized polymer, 10,000 ml of hydrogen instead of 1,000 ml of hydrogen was injected, and the other conditions were the same as in Example 2.

Analysis and VOC content results of the polymerized polymer are represented in Table 2.

Example 6

When performing a polypropylene polymerization process on the solid catalyst of Example 3 to produce a polymerized polymer, 7,000 ml of hydrogen instead of 1,000 ml of hydrogen was injected, and the other conditions were the same as in Example 3.

Analysis and VOC content results of the polymerized polymer are represented in Table 2.

Comparative Example 2

When performing a polypropylene polymerization process on the solid catalyst of Comparative Example 1 to produce a polymerized polymer, 15,000 ml of hydrogen instead of 1,000 ml of hydrogen was injected, and the other conditions were the same as in Comparative Example 1.

Analysis and VOC content results of the polymerized polymer are represented in Table 2.

TABLE 2

| Catalyst | Activity (Kg-PP/g-cat 2 h) | MI (g/10 min) | T-VOC content (ppm) |
|---|---|---|---|
| Example 4 | 65 | 90 | 250 |
| Example 5 | 70 | 100 | 190 |
| Example 6 | 80 | 95 | 150 |

TABLE 2-continued

| Catalyst | Activity (Kg-PP/g-cat 2 h) | MI (g/10 min) | T-VOC content (ppm) |
|---|---|---|---|
| Comparative Example 2 | 85 | 106 | 315 |

※ T-VOC content (ppm): The collected gases are measured by Headspace-GC by collecting gases for the number of carbon atoms 12 to 18 within the vial after containing 1 g of a PP sample in a 20 ml of a vial, sealing the vial containing the PP sample, and heating the sealed vial containing the PP sample at 180° C. for 1 hour.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A propylene polymerizing solid catalyst, the catalyst comprising a carrier produced by making dialkoxymagnesium react with a metal halide, a titanium halide, and an organic electron donor formed of a combination of a first internal electron donor including a compound of a cyclic diester structure and a second internal electron donor including a compound of a diether structure, wherein the first internal electron donor includes a cyclic diester compound that is one of compounds represented by the following structural formulas (II) to (IV), (VII), and (VIII):

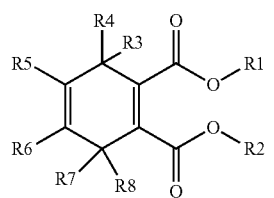
(II)

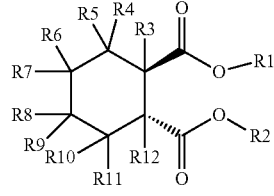
(III)

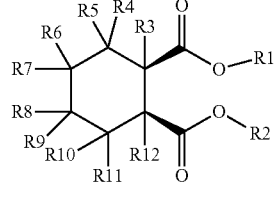
(IV)

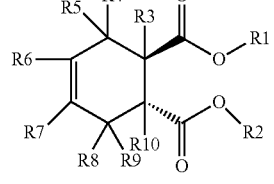
(V)

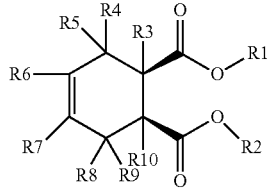
(VI)

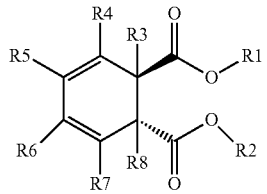
(VII)

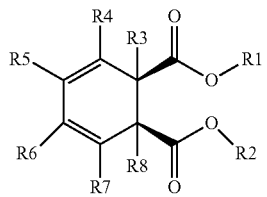
(VIII)

wherein R1 and R2, which are the same as or different from each other, are a linear, branched or cyclic alkyl group, alkenyl group, aryl group, arylalkyl group or alkylaryl group having 1 to 20 carbon atoms; and R3 to R12, which are the same as or different from one another, are hydrogen or a linear, branched or cyclic alkyl group, alkenyl group, aryl group, arylalkyl group or alkylaryl group having 1 to 20 carbon atoms.

2. The propylene polymerizing solid catalyst of claim 1, wherein the second internal electron donor includes a diether compound represented by the following chemical formula (ii):

$$R13R14C(CH_2OR15)(CH_2OR16) \tag{ii}$$

wherein, the compound is a 1,3-diether compound in which:
R13 and R14, which are the same as or different from each other, are an alkyl radical having 1 to 18 carbon atoms, a cycloalkyl radical having 3 to 18 carbon atoms, an aryl radical having 7 to 18 carbon atoms, or are combined to form a bicyclic or tricyclic unsaturated hydrocarbon, wherein each cyclic hydrocarbon consists of 5, 6, or 7 carbon atoms; and
R15 and R16, which are the same as or different from each other, are an alkyl radical having 1 to 4 carbon atoms.

3. A method of producing polypropylene, the method comprising polymerizing propylene in the presence of the propylene polymerizing solid catalyst for reducing the volatile organic compound (VOC) described in claim 1.

4. A method of producing polypropylene, the method comprising polymerizing propylene in the presence of the propylene polymerizing solid catalyst for reducing the volatile organic compound (VOC) described in claim 2.

5. The propylene polymerizing solid catalyst of claim 1, wherein the compound of a diether structure is 2-(2-ethylhexyl)-1,3-dimethoxypropane, 2-isopropyl-1,3-dimethoxypropane, 2-butyl-1,3-dimethoxypropane, 2-sec-butyl-1,3-dimethoxypropane, 2-cyclohexyl-1,3-dimethoxypropane, 2-phenyl-1,3-dimethoxypropane, 2-t-butyl-1,3-dimethoxypropane, 2-cumyl-1,3-dimethoxypropane, 2-(2-phenylethyl)-1,3-dimethoxypropane, 2-(2-cyclohexylethyl)-1,3-dimethoxypropane, 2-(p-chlorophenyl)-1,3-dimethoxypropane, 2-(diphenylmethyl)-1,3-dimethoxypropane, 2(1-naphthyl)-1,3-dimethoxypropane, 2(p-fluorophenyl)-1,3-dimethoxypropane, 2(1-decahydronaphthyl)-1,3-dimethoxypropane, 2(pt-butylphenyl)-1,3-dimethoxypropane, 2,2-dicyclohexyl-1,3-dimethoxypropane, 2,2-diethyl-1,3-dimethoxypropane, 2,2-dipropyl-1,3-dimethoxypropane, 2,2-dibutyl-1,3-dimethoxypropane, 2,2-diethyl-1,3-diethoxypropane, 2,2-dicyclopentyl-1,3-dimethoxypropane, 2,2-dipropyl-1,3-diethoxypropane, 2,2-dibutyl-1,3-diethoxypropane, 2-methyl-2-ethyl-1,3-dimethoxypropane, 2-methyl-2-propyl-1,3-dimethoxypropane, 2-methyl-2-benzyl-1,3-dimethoxypropane, 2-methyl-2-phenyl-1,3-dimethoxypropane, 2-methyl-2-cyclohexyl-1,3-dimethoxypropane, 2-methyl-2-methylcyclohexyl-1,3-dimethoxypropane, 2,2-bis(p-chlorophenyl)-1,3-dimethoxypropane, 2,2-bis(2-phenylethyl)-1,3-dimethoxypropane, 2,2-bis(2-cyclohexylethyl)-1,3-dimethoxypropane, 2-methyl-2-isobutyl-1,3-dimethoxypropane, 2-methyl-2-(2-ethylhexyl)-1,3-dimethoxypropane, 2,2-bis(2-ethylhexyl)-1,3-dimethoxypropane, 2,2-bis(p-methylphenyl)-1,3-dimethoxypropane, 2-methyl-2-isopropyl-1,3-dimethoxypropane, 2,2-diisobutyl-1,3-dimethoxypropane, 2,2-diphenyl-1,3-dimethoxypropane, 2,2-dibenzyl-1,3-dimethoxypropane, 2-isopropyl-2-cyclopentyl-1,3-dimethoxypropane, 2,2-bis(cyclohexylmethyl)-1,3-dimethoxypropyl, 2,2-diisobutyl-1,3-diethoxypropane, 2,2-diisobutyl-1,3-dibutoxypropane, 2-isobutyl-2-isopropyl-1,3-dimethoxypropane, 2,2-di-sec-butyl-1,3-dimethoxypropane, 2,2-di-t-butyl-1,3-dimethoxypropane, 2,2-dineopentyl-1,3-dimethoxypropane, 2-isopropyl-2-isopentyl-1,3-dimethoxypropane, 2-phenyl-2-benzyl-1,3-dimethoxypropane, 2-cyclohexyl-2-cyclohexylmethyl-1,3-dimethoxypropane, 9,9-bis(methoxymethyl)fluorene, 9,9-bis(methoxymethyl)-2,3,6,7-tetramethylfluorene, 9,9-bis(methoxymethyl)-2,3,4,5,6,7-hexafluorofluorene, 9,9-bis(methoxymethyl)-2,3-benzofluorene, 9,9-bis(methoxymethyl)-2,3,6,7-dibenzofluorene, 9,9-bis(methoxymethyl)-2,7-diisopropylfluorene, 9,9-bis(methoxymethyl)-1,8-dichlorofluorene, 9,9-bis(methoxymethyl)-2,7-dicyclopentylfluorene, 9,9-bis(methoxymethyl)-1,8-difluorofluorene, 9,9-bis(methoxymethyl)-1,2,3,4-tetrahydrofluorene, 9,9-bis(methoxymethyl)-1,2,3,4,5,6,7,8-octahydrofluorene or 9,9-bis(methoxymethyl)-4-t-butylfluorene.

* * * * *